United States Patent [19]
Joshi

[11] Patent Number: 6,137,171
[45] Date of Patent: Oct. 24, 2000

[54] LIGHTWEIGHT MINIATURIZED INTEGRATED MICROSATELLITE EMPLOYING ADVANCED SEMICONDUCTOR PROCESSING AND PACKAGING TECHNOLOGY

[75] Inventor: Abhay M. Joshi, Robbinsville, N.J.

[73] Assignee: Discovery Semiconductors, Inc., Princeton Junction, N.J.

[21] Appl. No.: 09/178,330

[22] Filed: Oct. 23, 1998

Related U.S. Application Data

[60] Provisional application No. 60/063,392, Oct. 27, 1997.

[51] Int. Cl.[7] .................................................... H01L 23/02
[52] U.S. Cl. ............................................ 257/723; 361/730
[58] Field of Search ..................................... 361/730, 736, 361/737, 796; 257/685, 686, 723, 730

[56] References Cited

U.S. PATENT DOCUMENTS

| | | | |
|---|---|---|---|
| 3,999,105 | 12/1976 | Archey et al. | 317/100 |
| 4,520,427 | 5/1985 | Brotherton et al. | 361/389 |
| 4,527,619 | 7/1985 | Cartier et al. | |
| 4,922,381 | 5/1990 | Longerich et al. | 361/414 |
| 5,199,672 | 4/1993 | King et al. | |
| 5,424,920 | 6/1995 | Miyake | |
| 5,581,498 | 12/1996 | Ludwig et al. | |
| 5,621,227 | 4/1997 | Joshi | |

OTHER PUBLICATIONS

Abhay M. Joshi, "Design of An Integrated Satellite (INT–SAT) Using Advanced Semiconductor Technology", CP420, *Space Technology and Applications International Forum*—1998, pp. 153–158.

*Primary Examiner*—David Hardy
*Attorney, Agent, or Firm*—Kenneth Watov; Watov & Kipnes, P.C.

[57] ABSTRACT

A plurality of silicon and GaAs wafers each including integrated circuitry for providing particular functions for each wafer are mounted within a housing in a stacked, spaced apart, and parallel configuration. Photodetectors and LED's are used to transmit and receive data between opposing wafers. In this manner a micro-packaged device or system is obtained for use amongst other things in lightweight miniaturized microsatellites.

21 Claims, 8 Drawing Sheets

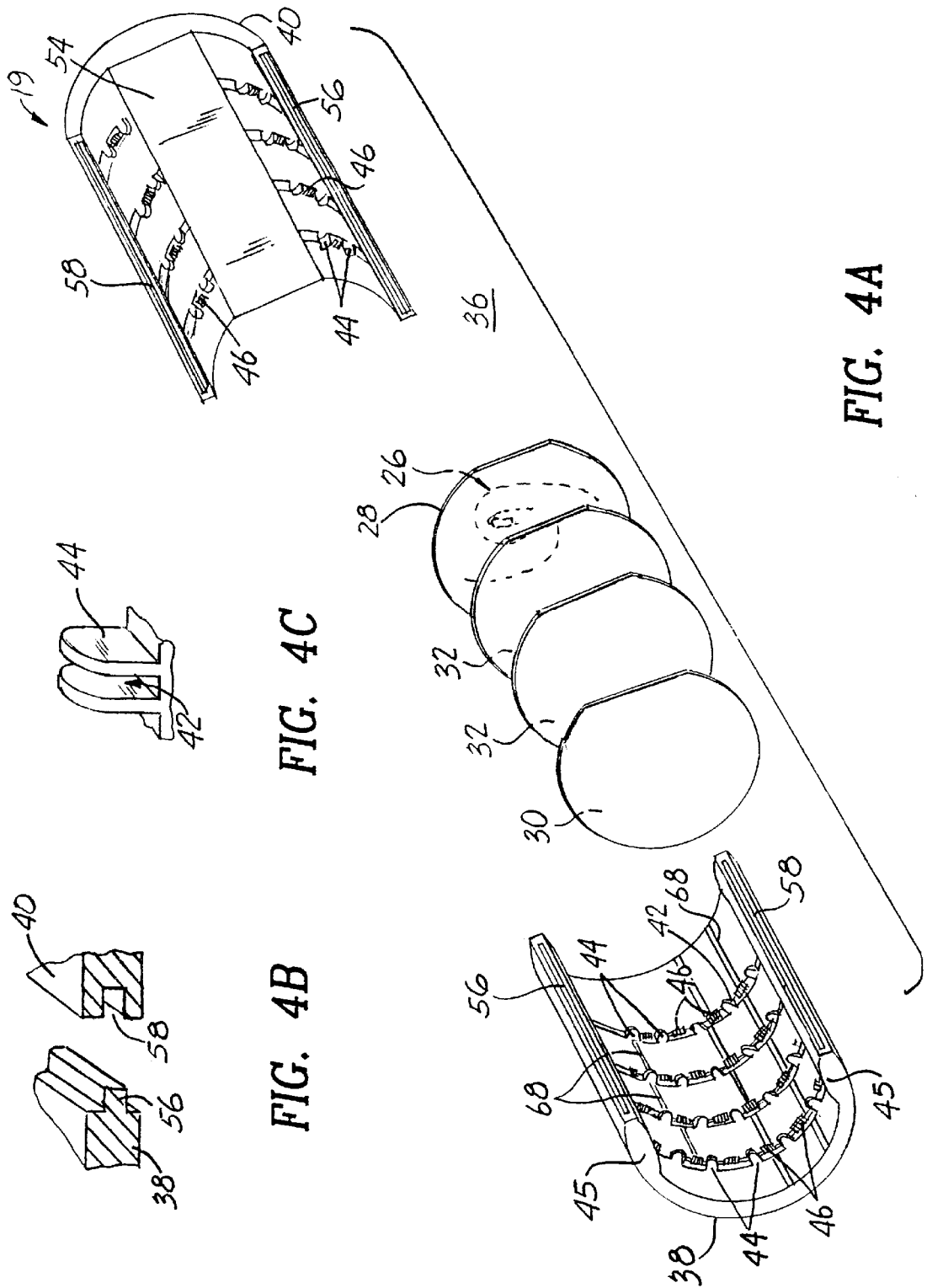

LIGHTWEIGHT MINIATURIZED INTEGRATED MICROSATELLITE EMPLOYING ADVANCED SEMICONDUCTOR PROCESSING AND PACKAGING TECHNOLOGY

RELATED APPLICATION

This invention is related to co-pending Provisional Application No. 60/063,392, filed Oct. 27, 1997, for "Integrated Circuit Microsatellite". The related Application has the same inventorship and assignee as the present invention.

FIELD OF THE INVENTION

The field of the present invention relates generally to the packaging of electronic devices and electro-mechanical systems, and more particularly to microsatellites.

BACKGROUND OF THE INVENTION

An objective of modem technology is to provide designs for the packaging of electronic devices, electric systems, and electromechanical systems that enhance reliability while minimizing volume. Such packaging is known as micropackaging, and is a design goal that has gained rampant interest over recent years. Micro-packaging techniques have resulted in a range of new product and system designs, including microsatellites for providing multiple functions, increased reliability, and minimum volume. Such microsatellites reduce payload weight, while reducing launch costs.

Microsatellites are fast becoming important scientific and commercial realities. However, most satellites that fall in this class are still fairly large (~50 Kg, ~0.5 m). One of the major obstacles in reducing these parameters further is the lack of integration of all the satellite's functions. Typically, most satellites are constructed from physically separate subsystems, each of which is composed of some combination of circuit boards and components. This partitioned approach wastes valuable space and weight directly by increasing demands on structure and power resources of the satellite.

SUMMARY OF THE INVENTION

An object of the invention is to provide a multifunction microsatellite of reduced cost, but with enhanced reliability.

Another object of the invention is to provide a substantially lightweight miniaturized integrated satellite (INT-SAT) that consists of all the electronic circuitry of a fully functional satellite condensed into one module.

Another object of the invention is to provide integrated circuit based designs for minimizing the weight and volume of electronic and electromechanical systems, while enhancing reliability.

These and other objects of the invention are met via one embodiment of the invention by producing integrated circuit wafers for providing individual functions on each wafer. The wafers are mounted within a housing in a stacked configuration, with the wafers being spaced apart and parallel to one another. Electrical interconnections between the wafers are provided by electrical connection means for making electrical connections along the edges of the wafers. Reliability is enhanced by providing function redundancy between two or more of the wafers. In a preferred embodiment of the invention, data is electro-optically transferred between wafers via light emitting and light detecting means.

BRIEF DESCRIPTION OF THE DRAWINGS

The invention is described with reference to the figures in which like items are identified by the same reference designation, wherein:

FIG. 4A is an exploded assembly view showing the packaging of a spaced apart stacked array of integrated circuit wafers, for various embodiments of the invention, in an example configured for use in the microsatellite of FIG. 1, but not limited thereto.

FIG. 4B shows a detailed view of the mating interface between the two halves of the housing of FIG. 4A.

FIG. 4C shows a detailed view of a wafer retaining stud and its groove.

DETAILED DESCRIPTION OF THE INVENTION

As will be described, the present invention provides an entirely integrated satellite (INT-SAT) that contains all the electronics of a fully functional satellite condensed into one module. This module is very compact and light-weight, and is constructed to include specially designed 4 to 8 inches silicon wafer and GaAs size chips. Through the creative use of semiconductor processing and crystal growth techniques, all the components required for a state of the art satellite can be implemented on the silicon and GaAs chips. The INT- SAT's condensed electronics module typically occupies only 200 cubic centimeters volume, and typically weighs less than 500 grams. Since the electronics are the heart of almost every mission, this integration of the present invention produces drastic savings in weight and size, enabling the reduction of satellite mass to well below 10 Kg. Note however that the packaging embodiments of the present invention are not meant to be limited for use in microsatellites, for such embodiments have broad use for minimizing the volume of various electronic devices.

Figure 1:
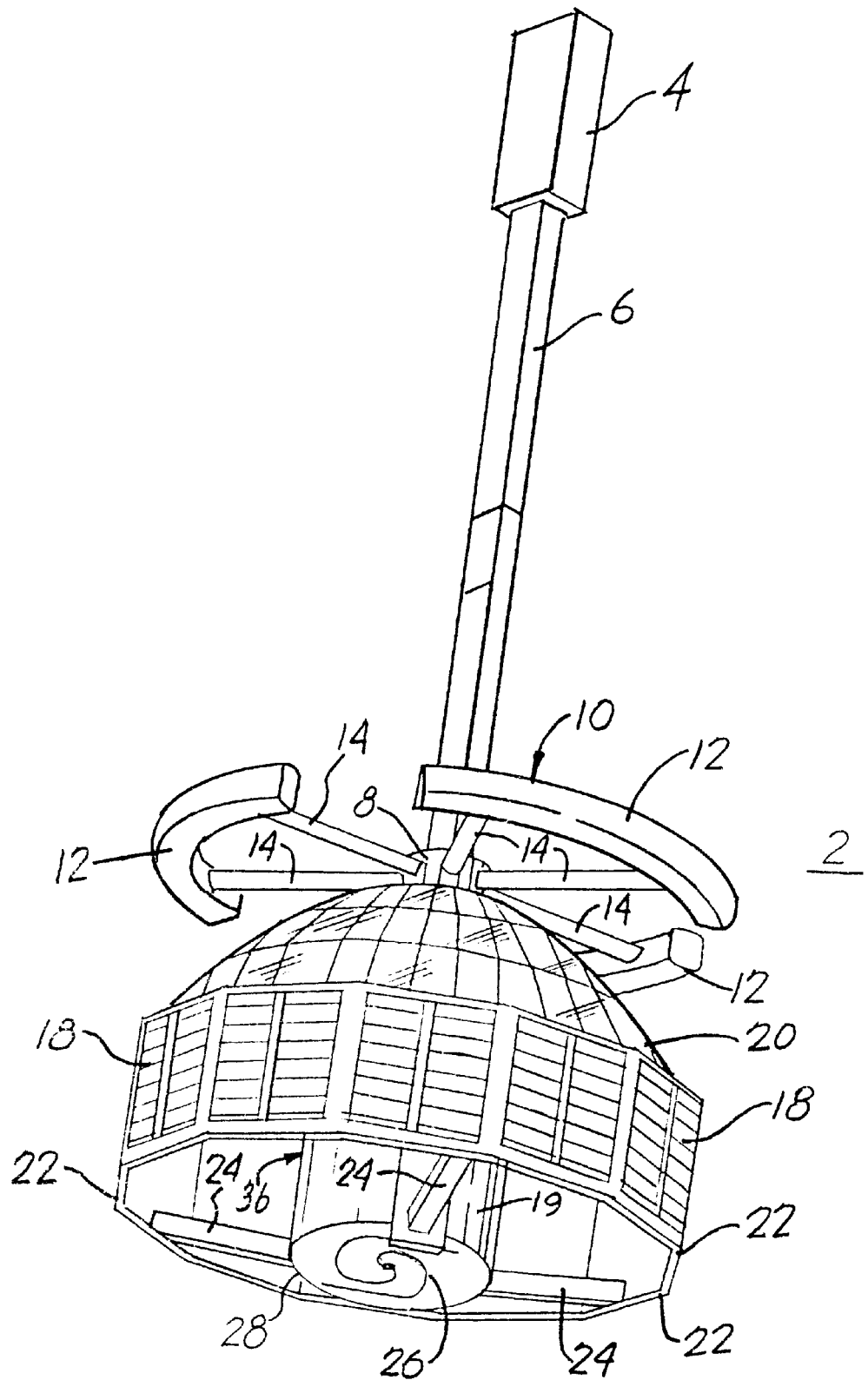
FIG. 1 is a pictorial view of an infrared telescope microsatellite incorporating various embodiments of the invention, the pictorial view being from the front and side of the microsatellite.
Figure 2:
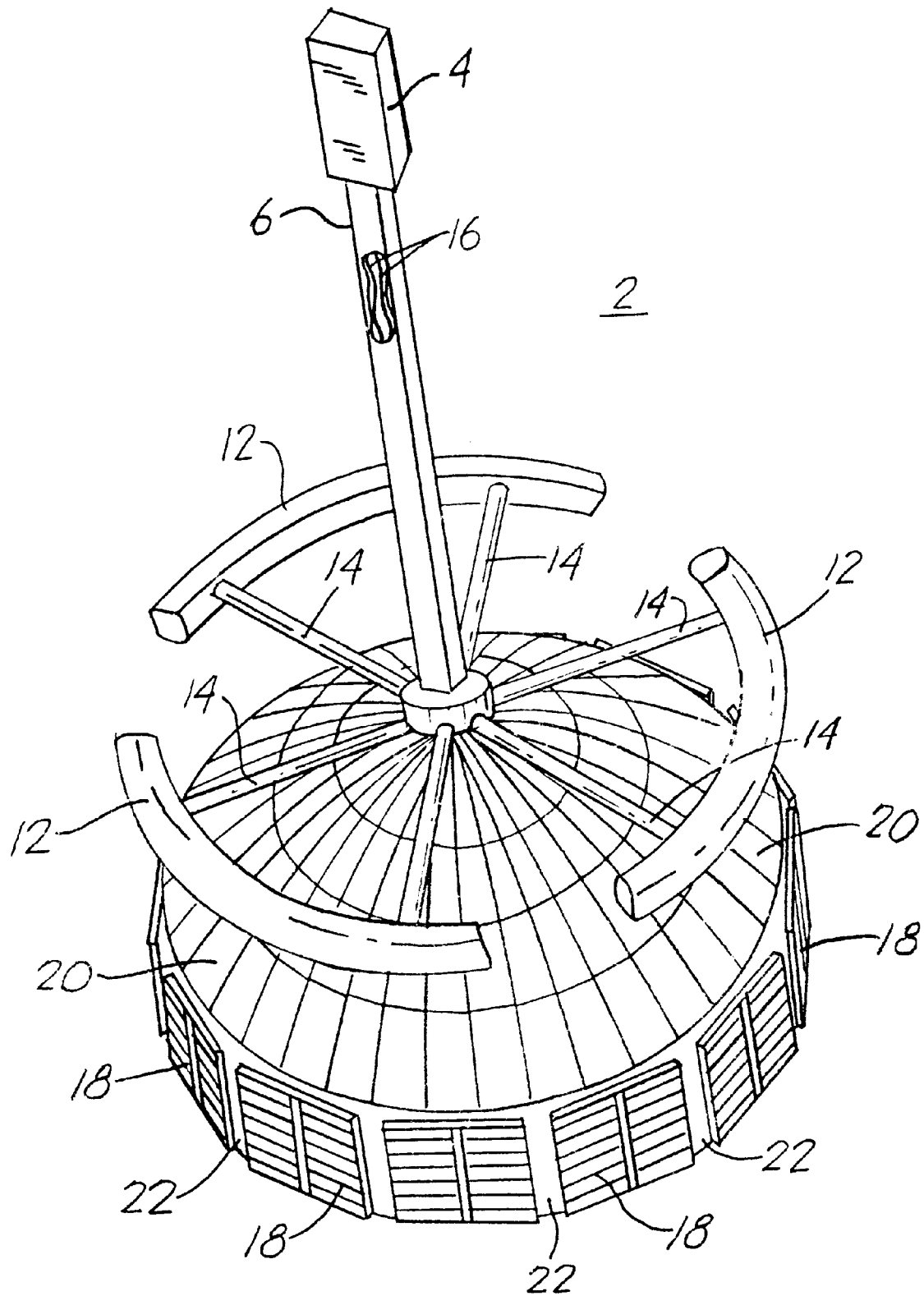
FIG. 2 is a pictorial view of the microsatellite of FIG. 1 looking from the side and rear of the microsatellite.

With reference to FIG. 1, a pictorial view of a microsatellite 2 incorporating various embodiments of the invention is shown. The configuration shown in this example is for a microsatellite telescope useful for visible, near-infrared, and short way-infrared spectroscopic imaging. However, this embodiment of the invention is not meant to be limited, and various of the embodiments of the invention incorporated within illustrative microsatellite telescope have much broader use for micro miniature packaging of integrated circuit electronic devices. As shown in this example, the microsatellite includes a battery pack 4 that also serves as a counterweight at the end of a gravity gradient boom 6. The other end of the gravity gradient boom is rigidly connected to a hollow central hub 8 of a roll control momentum wheel 10. The roll control momentum wheel 10 includes three outermost arc-like segments 12 connected to the central hub 8 by spokes 14 as shown. With reference also to FIG. 2, showing a pictorial of the rear or back portion of the microsatellite 2, as shown in the cutaway portion of the gravity gradient boom 6, a ribbon cable 16 is enclosed within the boom 6 for conducting power from the battery pack 4 through the hub 8 into an integrated wafer housing 19. As will be described in greater detail below, the ribbon cable 16 is used to both electrically conduct charging voltage derived from solar cells 18 to recharge the battery pack 4, and to also conduct power from the battery pack to the integrated wafer housing 19 during times of darkness in orbit. The microsatellite 2 further includes an outer parabolic housing 20 between the hub 8 and a ten-sided polygonal outermost housing shroud 22 covered with solar cells 18, as shown. The solar cells are rigidly secured to the housing shroud 22 through use of appropriate epoxy adhesive (not shown). The outer housing shroud is opened at its terminating end, and a plurality of mounting spokes 24 are connected between the inside wall surface of the shroud 22 and the integrated wafer housing 19. Ribbon cable (not shown) is run through hollow portions of the spokes 24 for electrically connecting the solar cells 18 to IC wafers in housing 19.

Figure 3:
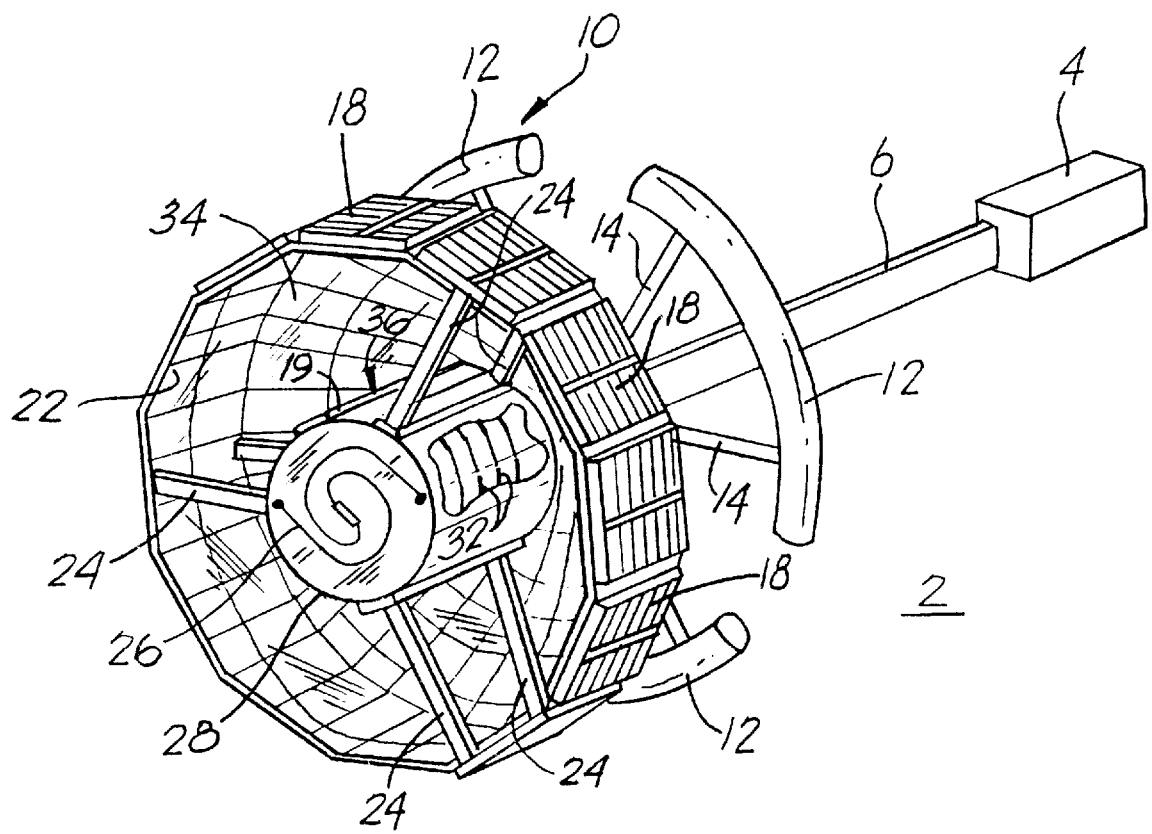
FIG. 3 is another pictorial view of the microsatellite of FIG. 1 looking into the front of the satellite with a portion of the cover of a centrally located housing for an integrated electronics module removed to show various details.

With further reference to FIGS. 1 and 2, and also to FIG. 3, the integrated wafer housing 19 is open at its front end for exposing an integrated photolithographic spiral antenna and photo-mixer device 26 formed on an integrated circuit wafer 28. A portion of the integrated wafer housing 19 has been removed in FIG. 3 for showing the stacked array of successive integrated wafers 32 securely mounted within housing 19, in a manner to be described in detail below. In this example, the innermost end of the housing 19 is open to expose a circular transparent sapphire window 30 (see FIG. 4A). The parabolic housing 20 has a mirrored inside wall surface 34 for reflecting light entering the front portion of the microsatellite 2 travel into the transparent window 30. Note that the transparent window 30 has the same shape as each of the integrated wafers 32. The integrated wafer housing 19 enclosing integrated wafers 32, the spiral antenna wafer 26, and transparent window wafer 30 forms an integrated electronics module 36, in which the wafers 32 are processed to include integrated circuitry for providing a bus section, instrument or control section, and a power section, for the microsatellite 2, in this example.

In FIG. 4A, an exploded assembly view is shown for the integrated electronic module 36. As shown, the integrated wafer housing 19 includes a first half-section 38, and a mating second half-section 40. Each half-section includes a plurality of grooves 42 formed in a plurality of successive standoffs or wafer retaining studs 44 as shown. In this example, the integrated wafer housing 19 is cylindrically shaped, but can be otherwise shaped on its outside surface. In the space between the wafer retaining studs 44 a plurality of wafer retaining finger contacts 46 are retained between the wafer retaining studs 44 via axle pins 48 and spring retention pins 50, as shown in FIGS. 6A, 6B, and 6C. Also, note as shown in FIG. 5A, that each of the wafers 32 have a flat or secant edge portion 52 that is aligned when the wafers 32 are mounted within the first half-section housing 38 to be aligned toward the second half-section housing 40, whereby when the latter is joined to the former the flat internal surface section 54 of the second half-section housing 40 abuts against the flat section 54 for substantially preventing rotation of the wafers 32, and also for insuring that the wafers 32 are properly aligned within the wafer housing 19.

With reference to FIGS. 4A and 4B, note that the longitudinal opposing edge portions of each of the first and second half-section housings include a tongue 56 for mating with a groove 58 of opposing edge portions of the first and second half-section housing 38 and 40. In the preferred embodiment of the invention, the integrated wafer housing 19 can consist of graphite or silicon carbide produced by machining, or from carbon fiber formed in a mold. Metals such as aluminum or stainless steel can also be used, but then care must be taken to insure that the electrically conductive portions of the spring retention pins 50, contact fingers 46, and axle pins 48 are electrically insulated from the electrically conductive housing 19. Note further that the axle pins 48 and spring retention pins 50 are secured between the wafer retaining studs 44 using any appropriate mechanical securing means or epoxy adhesives.

Figure 5A:
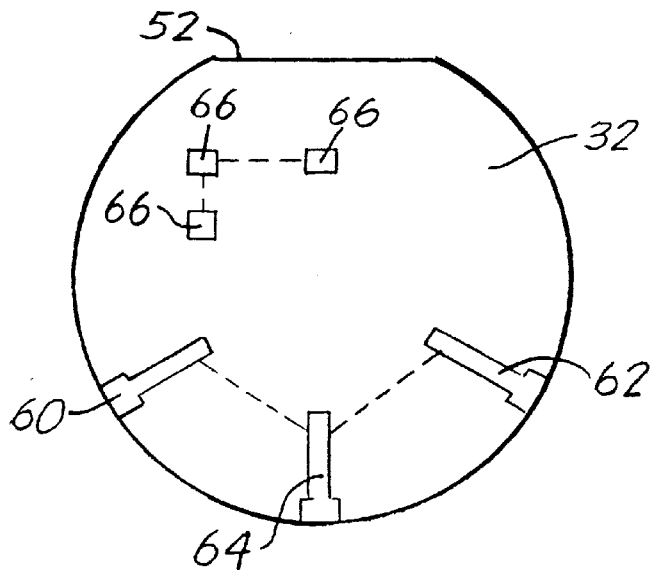
FIG. 5A is a top plan view of an integrated circuit wafer for one embodiment of the invention.
Figure 6A:
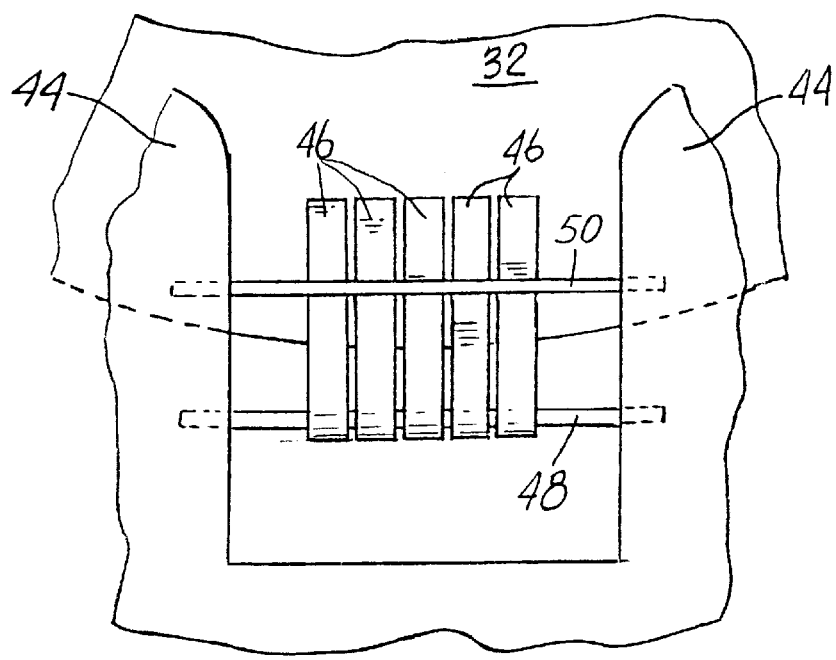
FIG. 6A shows a pictorial view of a contact finger for one embodiment of the invention.
Figure 6C:
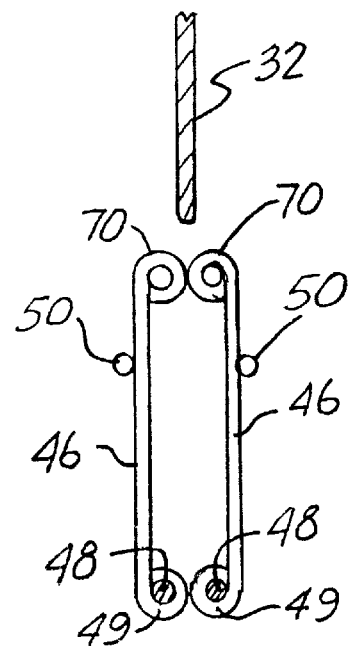
FIG. 6C shows a side elevational view of the mounting assembly of FIG. 6A and 6B.
Figure 6B:
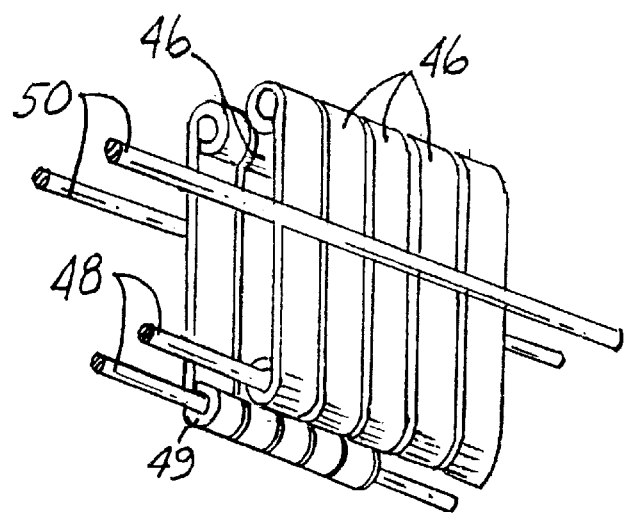
FIG. 6B shows a pictorial detailed view of the mounting for five spring contact fingers within a groove of the housing for retaining and electrically contacting a portion of an integrated circuit wafer.

With further reference to FIG. 5A, a typical integrated wafer 32 may include at least three printed circuit electrically conductive buses, such as a positive voltage bus 60, and negative voltage bus 62, and a ground or reference voltage bus 64. Also, the integrated wafer 32 may include a plurality of integrated circuit portions 66, that are formed on the wafer using conventional integrated circuit manufacturing techniques. The integrated wafers 32 may consist of silicon wafers, GaAs (Gallium Arsenide) wafers, and so forth, as the application dictates.

Figure 5B:
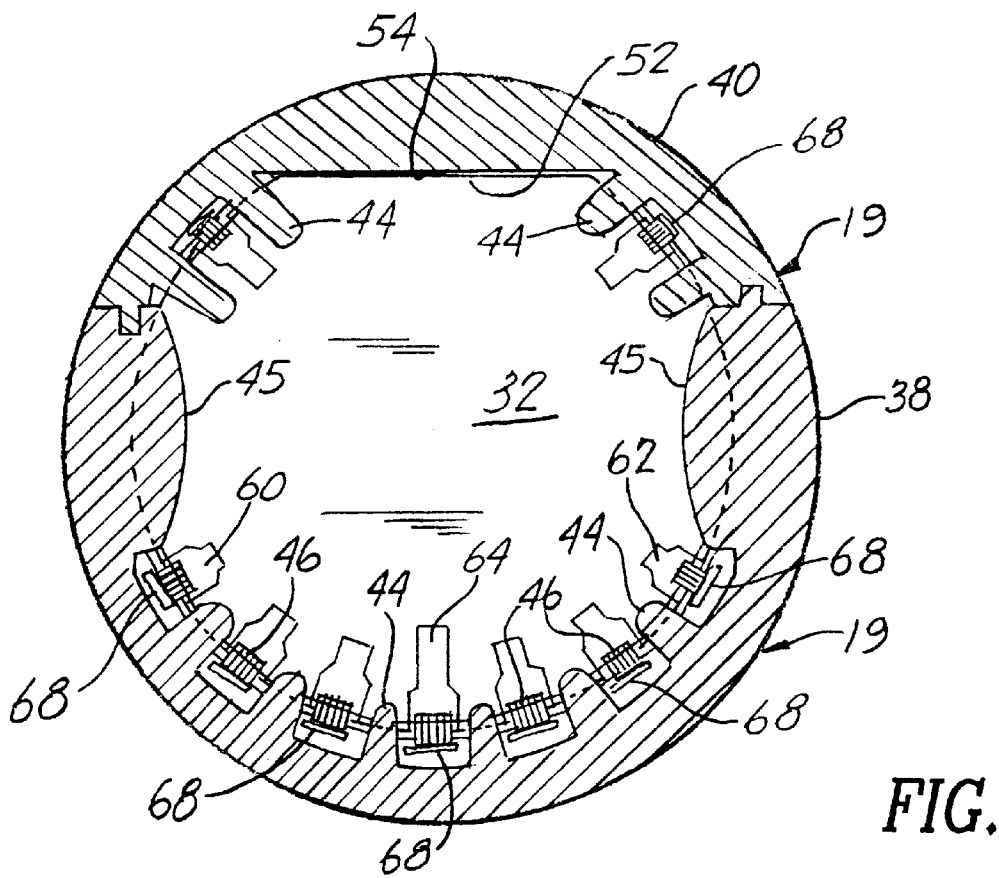
FIG. 5B is a cross-sectional front elevational view of a housing showing the installation of an integrated circuit wafer for one embodiment of the invention.

With further reference to FIGS. 4A and 5B, the ribbon cables 68 are either silver solder or braised to the back portions of the contact fingers 46 (see FIG. 5B) for connecting the appropriate voltages and ground to selective ones of the retaining fingers contacts 46, with the ribbon cables 68 serving as the positive voltage bus 60, negative voltage bus 62, and ground or reference voltage bus 64. It should be noted that the provision of such buses can be provided by other than the use of ribbon cable. As shown, the contact fingers 46 include axle feed throughs 49 at their innermost ends, through which axle pins 48 are inserted for securing the axle ends of the fingers 46 between the retaining studs 44. Also, spring retention pins 50 are rigidly mounted between the retaining studs 44 in contact with the top surfaces of the opposing contact fingers 46, for retaining the free ends 70 of the finger contacts 46 abutted against the opposing free ends 70 of the opposing finger contacts 46.

The finger contacts 46 can be fabricated from beryllium copper spring metal, for example. When an integrated wafer 32 is inserted into the grooves 42 the wafer retaining studs 44 (see FIG. 4C), the edge of the wafer 32 also pushes against the rounded portions of the ends 70 of the opposing pairs of finger contacts 46 adjacent the studs 44, forcing the opposing finger contacts 46 apart for permitting the wafer to be pushed into the grooves 42 of the wafer retaining studs 44 (see FIG. 4C), while being rigidly retained via the frictional engagement with the finger contacts 46. The ends 70 of the finger contacts 46 also are in electrical contact with a printed circuit bus on the wafers 32, for connecting the printed circuit buses to the appropriate ones of the ribbon cables 68, as explained herein. Note that the housing section 38 also includes two opposing elongated wafer retaining studs 45, relative to retaining studs 44.

Figure 7:
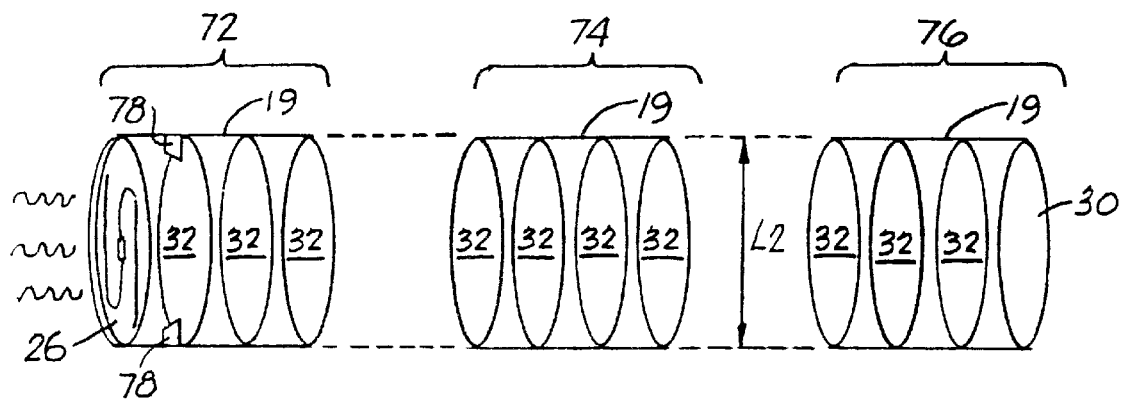
FIG. 7 shows a simplified cut-away view of a plurality of integrated circuit wafers mounted within a housing for one embodiment of the invention.

As shown in FIG. 7, the integrated wafers 32 are grouped into three functional sections. More specifically, one group of the wafers 32 are included in a bus section 72, a second group of the wafers 32 are included in an power section 74, and a third group of the wafers 32 are included in a instrument section 76. The bus section 72 includes the integrated circuitry for providing microprocessors, required data memories, required programs stored in memory, and so forth. Note that sun sensors 78 are included on the housing 19 for providing signals to the bus section for switching the microsatellite power from the battery pack 4 to the solar cells 18 when the microsatellite 2 goes from darkness into sun light, and vice versa. Note that in this example each one of the integrated wafers 32 provide a particular function for the microsatellite 2. For purposes of reliability, a plurality of identical integrated wafers 32 may be included for insuring that with regard to the particular function provided, that if one of the integrated wafers 32 becomes defective, another will be available to provide the same functions to insure that the microsatellite 2 continues to operate properly. The length of the integrated wafer housing 19, L1, in this example is about 100 millimeters, whereas the diameter of the cylindrical housing shown as dimension L2 is about 100 millimeters. In different applications, the length L1 and diameter L2 may be greater than or less than the dimensions indicated here.

The multiple wafer design shown in FIG. 7 above is modular in nature. All of the basic satellite platform functionality is placed on wafers 32 in the bus section 72 of the INT-SAT, which leaves the instrument section 76 free for adaptation to different missions. The idea is to have an architecture made of a stack of wafers 32 so that each can have certain functionality. If there are changes to be made to a particular wafer's design, then that wafer 32 can be replaced fairly easily with another. In addition, if higher reliability is needed, parallel wafers 32 having the same functionality are installed to provide back-up capability. Thus, during a launch, if one wafer 32 is lost, the other one with the same functionality can get the mission done. Furthermore, in a semiconductor foundry, usually a batch of 25 to 50 identical wafers is routinely manufactured. Thus, manufacturing multiple wafers 32 of the same functionality does not increase the production costs.

Figure 8:
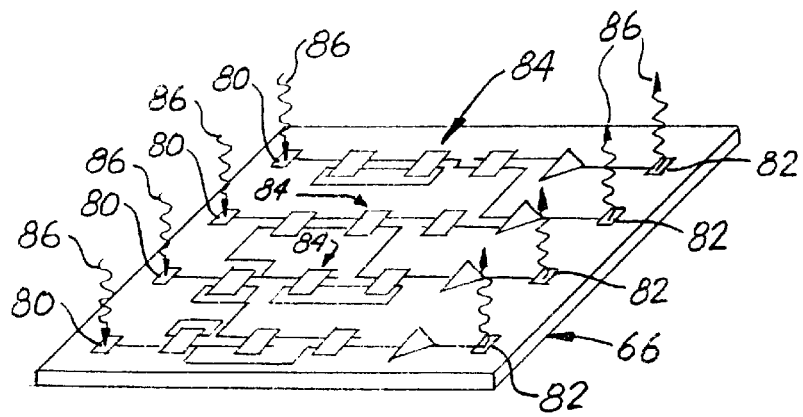
FIG. 8 is a detailed view of one portion of an integrated circuit wafer including light detecting devices, light emitting devices, and signal processing circuitry for one embodiment of the invention.

In FIG. 8, for this example of a microsatellite telescope, the integrated circuit portions 66 on an integrated wafer 32 for use in the instrument section 76 may include integrated circuitry such as a plurality of integrated circuit light detectors 80, a plurality of integrated light emitters 82, and required other integrated circuitry 84 for converting light detected by the light detectors 80 into electrical signals, and for driving the light emitters 82 to emit data modulated light 86. Indium gallium arsenide light detectors and light emitters can be used for providing the light detectors 80, and the light emitters 82, respectively, for example. CMOS circuitry can be used for providing the circuitry 84, for example. In a preferred embodiment of the invention, the light detectors 80 and associated readout circuitry 84 can be provided by use of monolithic optoelectronic integrated circuits, which include a photodiode and CMOS readout circuitry, as described in U.S. Pat. No. 5,621,227, entitled "Method and Apparatus for Monolithic Optoelectronic Integrated Circuit Using Selective Epitaxy", having the same inventorship and assignee as the present invention. The teachings of this patent are incorporated herein by reference to the extent that they do not conflict herewith.

Figure 9:
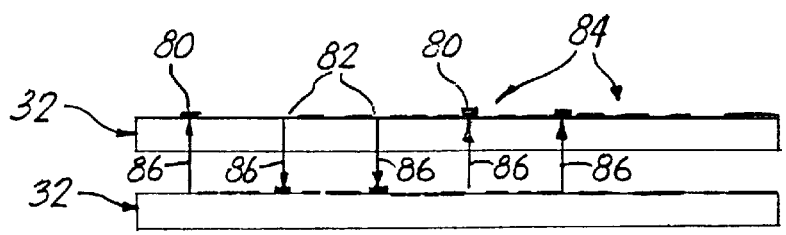
FIG. 9 is a simplified view along the edges of two spaced apart integrated circuit wafers illustrating electro-optical data communication between the opposing light emitting devices and light detecting devices epitaxially grown or otherwise deposited on the integrated circuit wafers.

As shown in FIG. 9, in another embodiment of the invention, two integrated wafers 32 each including a plurality of integrated circuits 66 as shown in FIG. 8, provide a proximity focused 3-dimensional integration architecture for the transfer of data between two or more successive stacked integrated wafers 32 fabricated as indicated. Through use of the described optical links between the light emitting devices 82 and light detecting devices 80, data can be electro optically transferred without use of hardwiring.

In this example, detectors formed from InGaAs on silicon, operating at wavelengths in the 1100 nm to 1600 nm band, serve as inputs to a generic signal processing unit. The use of InGaAs material and the indicated wavelength band provides compatibility with fiber optics, good detector performance, and through chip transparency. The circuitry can be implemented using silicon CMOS technology. This allows the processor to be nearly unlimited in size, power, and complexity, providing for great design flexibility. The outputs of the processor can drive LEDs or lasers formed from the same InGaAs on silicon as the detectors. This capability of growing optical sources on the same chip as the processor (see U.S. Pat. No. 5,621,227) enables the entire system to function.

The architecture of INT-SAT is specifically designed to support many different mission instruments. The present illustrative example is for remote sensing applications, especially for visible, near infrared, and short wave infrared imaging of the Earth. InGaAs-on-Silicon photodetector arrays can capture images at wavelengths from 0.3 to 2.6 microns, by using both silicon and InGaAs materials as the photo sensors. In addition, spectrographic information is of great use in remote sensing applications. Therefore, the present integrated remote sensing spectroscopic imaging instrument is one application of the present invention.

Figure 10:
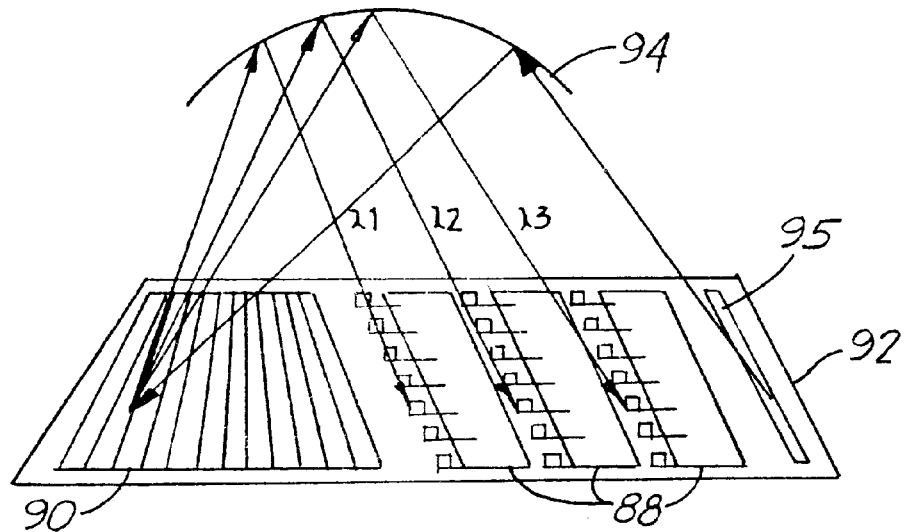
FIG. 10 shows an integrated circuit wafer including a surface grating, and array of light detecting devices, for an embodiment of the invention incorporated within an infrared telescope for a microsatellite.

The basic inventive concept can be applied to make both a photodetector array 88 and an optical surface grating 90 on the same silicon substrate (See FIG. 10). The silicon chip 92 is divided into three areas: the detector array and readout electronics 88, and the grating area 90. The incoming light from an input slit 95 is directed onto the surface grating 90, which is metallized, and therefore, reflective. The light is diffracted off the grating 90 and focused by a curved focus mirror 94 (which can be part of a neighboring wafer mount) onto the photodetector array 88. In the multi-array device shown, there are several arrays, and they are placed parallel to the grating grooves at specific locations. This arrangement results in each array 88 capturing a row of pixels at a specific wavelength, with each array registering a different wavelength. This is best suited for spectral window imaging. "Spectral window imaging" means the capture of a complete image using two (or more) predefined wavelengths. The data set obtained is of the form $I(x, y, \lambda_i)$ where i=1, 2 ... n. This device is best suited for use in a spectral line scan camera.

The mechanical scanning needed to produce a complete image can be accomplished by using the motion of the satellite in its orbit (Pushbroom Technique).

With further reference to FIGS. 1 through 3, the integrated microsatellite of this example can be maintained in an Earth pointing orientation in a low Earth polar orbit. The INT-SAT's integrated electronic module 36 is placed at the Earth side of the microsatellite 2. The remote sensing telescope of this example forms the bulk of the microsatellite 2. The optical design can be either a simple Newtonian or a Schmitt telescope, which provide the correct Earth-facing geometry and have a single mirror. The barrel of the telescope is formed by the ten-sided polygonal housing 22, covered on the exterior faces with solar cells 18. The roll control momentum wheel 10 is placed behind the telescope mirror 34. The outer surface of the wheel 10 can also be covered with solar cells. The long, extensible gravity gradient boom 16 extends from the rear of the microsatellite 2, and carries the battery pack 4, which also serves as a counterbalancing mass. Once deployed, the gravity gradient effect would serve to point the satellite towards the Earth, thereby passively controlling the pitch and yaw. Note that all the components besides the bus, instrument, and power section 72, 76, 74, respectively, (Integrated Electronics) are passive.

The entire satellite is very small, occupying only ~5000 cubic centimeters volume. The INT-SAT's bus—instrument (Integrated Electronics) module 36 itself only occupies ~200 cc, and is expected to weigh less than 500 grains. This shows how integration shrinks the payload size & weight.

Figure 11:
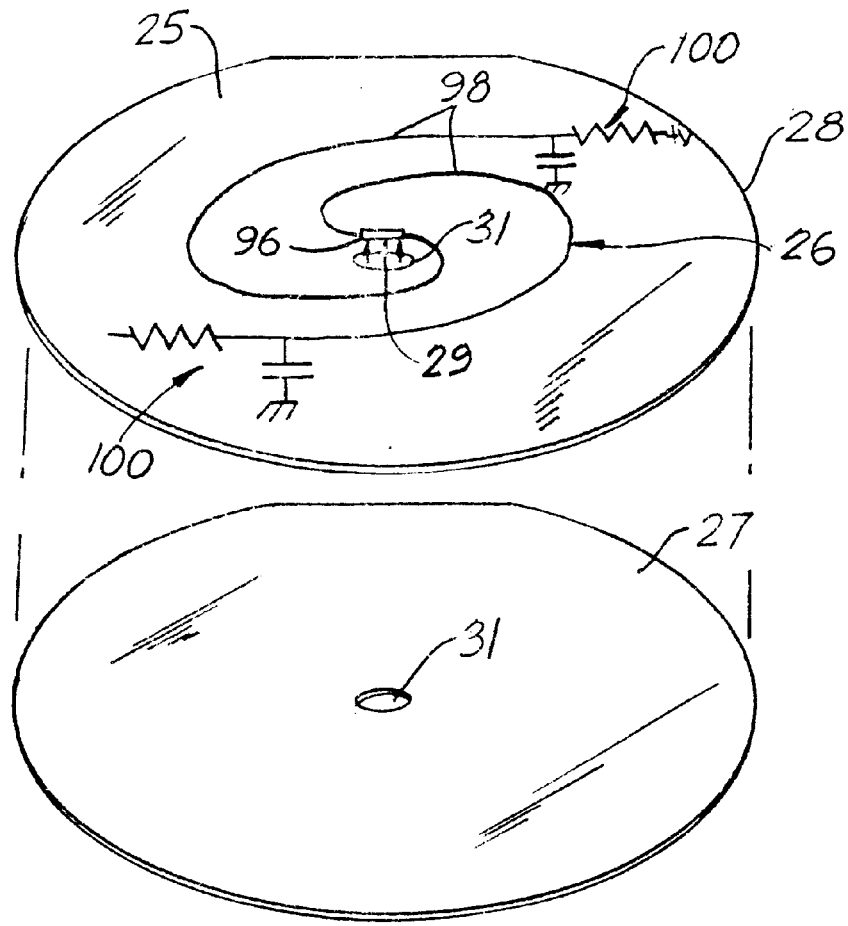
FIG. 11 shows an integrated circuit wafer including an integrated photolithographic spiral antenna and photo-mixer device on one side, and a ground plane on the other side, for another embodiment of the invention.

A simplified diagram of the design concept is shown in FIG. 3. In FIG. 11, the antenna structure 26 is photolithographically fabricated on an insulating substrate (wafer) 28 with a ground plane 27. The antenna 26 is a double equi-angular spiral type, which is well known for its wide bandwidth and circular polarization. These are desirable properties, as the frequency is high and the orientation of the satellite with respect to the ground station is not known. The antenna 26 has an InGaAs photoresistor 96 placed at its center, interconnecting the two arms 98 of the spiral. There are also connections made to the edges of the antenna 26 (here shown as a lumped circuit elements 100) for bias and signal input.

The InGaAs photoresistor 96 is illuminated from beneath by a pulsed laser (not shown). The pulsed laser light enters through a hole 31 in a ground plane metallization on the bottom of substrate 28, and through a window 29 through the substrate 25 of the IC wafer 28. The resistance of photoresistor 96 is thereby modulated at the frequency of the pulsed light. When the antenna 26 is biased with a DC voltage, there will be a resulting alternating current established in the antenna. The antenna structure, the edge components, and the photoresistor 96 can be selected so that the antenna 26 is resonant at the frequency of operation, thereby, amplifying the oscillating current. This current will stimulate the antenna 26 into radiation.

The pulsed laser can be implemented in several ways, but one of the most promising methods is to fabricate a passively mode-locked semiconductor laser. This technique, which has already been demonstrated, produces a laser that emits pulses whose frequency is determined by the optical length of the cavity. Given present frequency and materials choices, the cavity will be approximately 0.75 mm long, which is well within practical fabrication limits. In the integrated bus, the laser is placed on a wafer below the antenna wafer, but it would have optical access to the InGaAs photoresistor 96.

Although various embodiments of the invention have been shown and described above, they are not meant to be limiting. Those of skill in the art may recognize certain modifications to these embodiments, which modifications are meant to be covered by the spirit and scope of the appended claims.

What is claimed is:

1. An integrated microsatellite comprising:
    a central housing;
    a plurality of integrated circuit (IC) wafer means for providing at least individual functions, respectively;
    means for mounting said plurality of IC wafer means in said central housing in a spaced apart and parallel relationship providing a stacked array thereof;
    a plurality of electrically conductive bus means secured to an interior surface of said housing in longitudinal orientation for conducting power, and a source of reference voltage between said plurality of wafer means, respectively;
    a plurality of electrical connector means for both mechanically securing said plurality of IC wafer means in said housing, and selectively electrically connecting said plurality of electrically conductive bus means to corresponding buses formed on said plurality of IC wafer means, respectively; and
    means for providing data communication between selected ones of said plurality of IC wafer means.

2. The microsatellite of claim 1, wherein said data communication means includes a plurality of light emitting means on the selected ones of said plurality of IC wafer means, for transmitting light waves modulated by data to an opposing IC wafer means, the opposing IC wafer means including a plurality of light detecting means for receiving said data modulated light waves, respectively, to convert the latter into respective electrical data communication signals, thereby providing electro-optical data communication between selected opposing ones of said plurality of IC wafer means.

3. The microsatellite of claim 2, wherein said plurality of light emitting means includes indium gallium arsenide emitting diodes.

4. The microsatellite of claim 2, wherein said plurality of light detecting means including indium gallium arsenide light detectors.

5. The microsatellite of claim 3, wherein said plurality of light detecting means includes indium gallium arsenide light detectors.

6. The microsatellite of claim 1, wherein said central housing is made from material selected from the group consisting of graphite, silicon carbide, carbon fiber, aluminum, and stainless steel.

7. The microsatellite of claim 1, wherein said central housing is cylindrical and includes a plurality of radially directed spaced apart grooves for receiving said plurality of IC wafer means, respectively.

8. The microsatellite of claim 7, wherein said plurality of spaced apart grooves each include a plurality of spaced apart standoffs having radially directed grooves for receiving said plurality of IC wafer means, respectively, said standoffs being arranged in successive spaced apart circular configurations along the inside wall of said housing.

9. The microsatellite of claim 1, wherein said plurality of electrically conductive bus means consists of ribbon cables.

10. The microsatellite of claim 8, wherein said plurality of electrical connector means are mounted in spaced apart relationship between said plurality of spaced apart standoffs for receiving said plurality of IC wafer means, respectively.

11. The microsatellite of claim 2, wherein the selected ones of said plurality of IC wafer means includes CMOS circuitry for processing data signals detected by said light detecting means, respectively.

12. The microsatellite of claim 2, wherein the selected ones of said plurality of IC wafer means includes CMOS circuitry for receiving electrical data signals to drive associated ones of said plurality of light emitting means, respectively.

13. The microsatellite of claim 1, further including:

an outer housing enclosing said central housing in the center of said outer housing with mutual longitudinal axes overlying one-another, a front portion of said outer housing being open;

a plurality of solar cells arranged around and rigidly attached to an outer front portion of said outer housing, the rear portion of said housing being enclosed;

a battery pack;

a gravity gradient boom having one end connected to the center of the rear portion of said outer housing, and the other end of said boom being rigidly connected to said battery pack;

said plurality of IC wafer means being grouped by function into a bus section, a power section, and an instrument section;

means for electrically connecting said battery pack to said IC wafer means in said power section; and means for electrically connecting said solar cells to said IC wafer means in said power section.

14. The microsatellite of claim 1, further including:

said central housing having an open front end; and one of said plurality of IC wafer means consisting of an integrated photolithographic spiral antenna including a photo mixer device mounted at the open front end of said central housing.

15. The microsatellite of claim 14, wherein said integrated photolithographic spiral antenna includes:

a substrate forming a wafer having a top portion, and a bottom portion;

a pair of electrically conductive equiangular spiral arms formed on a top portion of said substrate;

a photoresistor formed in the center of the top portion of said substrate interconnecting said pair of equiangular spiral arms;

means formed on the top portion of said substrate for applying bias voltages and input signals to the free ends of said equiangular spiral arms; and a ground plane deposited on the bottom portion of said substrate, said ground plane including a central opening for permitting pulsed laser light to be passed through said substrate to illuminate said photoresistor with modulated light.

16. An integrated circuit (IC) wafer packaging system comprising:

a housing;

a plurality of integrated circuit (IC) wafer means for providing at least individual functions, respectively;

means for mounting said plurality of IC wafer means in said housing in a spaced apart and parallel relationship providing a stacked array thereof;

a plurality of electrically conductive bus means secured to an interior surface of said housing in longitudinal orientation for conducting power, and a source of reference voltage between said plurality of wafer means, respectively;

a plurality of electrical connector means for both mechanically securing said plurality of IC wafer means in said housing, and selectively electrically connecting said plurality of electrically conductive bus means to corresponding buses formed on said plurality of IC wafer means, respectively; and means for providing data communication between selected ones of said plurality of IC wafer means, said data communication means including:

a plurality of light emitting means on the selected ones of said plurality of IC wafer means, for transmitting light waves modulated by data to an opposing IC wafer means, the opposing IC wafer means including a plurality of light detecting means for receiving said data modulated light waves, respectively, to convert the latter into respective electrical data communication signals, thereby providing electro-optical data communication between selected opposing ones of said plurality of IC wafer means.

17. The IC wafer packaging system of claim 16, wherein said housing is cylindrical and includes a plurality of radially directed spaced apart grooves for receiving said plurality of IC wafer means, respectively.

18. The IC wafer packaging system of claim 17, wherein said plurality of radially directed spaced apart grooves each include a plurality of spaced apart standoffs having radially directed grooves for receiving said plurality of IC wafer means, respectively, said standoffs being arranged in successive spaced apart circular configurations along the inside wall of said housing.

19. The microsatellite of claim 18, wherein said plurality of electrical connector means are mounted in spaced apart relationship between said plurality of spaced apart standoffs for receiving said plurality of IC wafer means, respectively.

20. An integrated microsatellite comprising:

a central housing;

a plurality of integrated circuit (IC) wafer means for providing at least individual functions, respectively;

means for mounting said plurality of IC wafer means in said central housing in a spaced apart and parallel relationship providing a stacked array thereof;

a plurality of electrically conductive bus means secured to an interior surface of said housing in longitudinal orientation for conducting power, and a source of reference voltage between said plurality of wafer means, respectively;

a plurality of electrical connector means for both mechanically securing said plurality of IC wafer means in said housing, and selectively electrically connecting said plurality of electrically conductive bus means to corresponding buses formed on said plurality of IC wafer means, respectively;

means for providing data communication between selected ones of said plurality of IC wafer means;

said central housing having an open front end; and one of said plurality of IC wafer means consisting of an integrated photolithographic spiral antenna including a photo mixer device mounted at the open front end of said central housing.

21. The microsatellite of claim 20, wherein said integrated photolithographic spiral antenna includes:

a substrate forming a wafer having a top portion, and a bottom portion;

a pair of electrically conductive equiangular spiral arms formed on a top portion of said substrate;

a photoresistor formed in the center of the top portion of said substrate interconnecting said pair of equiangular spiral arms;

means formed on the top portion of said substrate for applying bias voltages and input signals to the free ends of said equiangular spiral arms; and a ground plane deposited on the bottom portion of said substrate, said ground plane including a central opening for permitting pulsed laser light to be passed through said substrate to illuminate said photoresistor with modulated light.

* * * * *

UNITED STATES PATENT AND TRADEMARK OFFICE
CERTIFICATE OF CORRECTION

PATENT NO. : 6,137,171
DATED : October 24, 2000
INVENTOR(S) : Abhay M. Joshi

It is certified that error appears in the above-identified patent and that said Letters Patent are hereby corrected as shown below:

Column 1, line 11 after the title, change "modem" to - -modern- -.

Signed and Sealed this

Eighth Day of May, 2001

*Attest:*

NICHOLAS P. GODICI

*Attesting Officer*   *Acting Director of the United States Patent and Trademark Office*